T. MORGAN & J. F. NEIDHART.
Pot-Bail and Lid-Holder.
No. 218,304.    Patented Aug. 5, 1879.
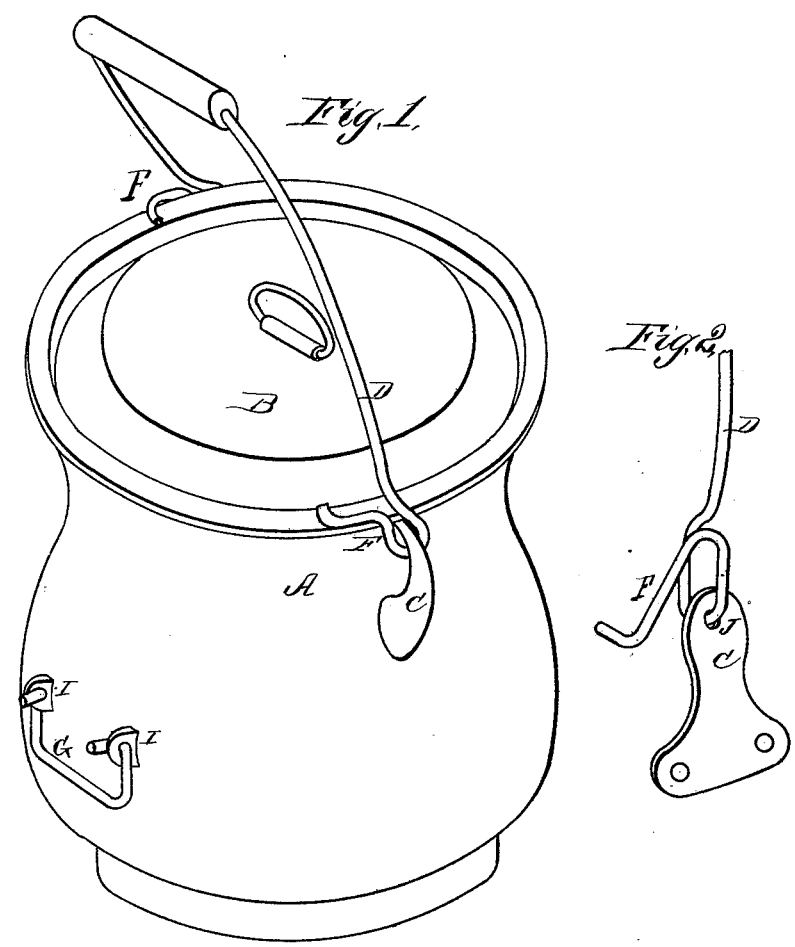

UNITED STATES PATENT OFFICE.

THOMAS MORGAN AND JOSEPH F. NEIDHART, OF MARQUETTE, MICHIGAN.

IMPROVEMENT IN POT-BAIL AND LID-HOLDER.

Specification forming part of Letters Patent No. 218,304, dated August 5, 1879; application filed January 4, 1879.

*To all whom it may concern:*

Be it known that we, THOMAS MORGAN and JOSEPH F. NEIDHART, of the city of Marquette, in the county of Marquette and State of Michigan, have invented certain new and useful Improvements in Pot-Bail and Lid-Holder combined, in combination with side handle; and we do hereby declare that the following is a full, clear, and exact description thereof, reference being had to the accompanying drawings, and to the letters of reference marked thereon, which form part of this specification.

The nature of our invention consists in the construction of a bail for pots or other open-mouthed vessels, so as to form a holder for the lid at the same time; and in the combination of parts, as will be hereinafter more fully set forth.

In order to enable others skilled in the art to which our invention appertains to make and use the same, we will now proceed to describe its construction and operation, referring to the annexed drawings, in which—

Figure 1 is a perspective view of a pot having our bail attached, and Fig. 2 is a detail view of a modification of our bail.

A represents a pot or other open-mouthed vessel, and B is the lid, placed loosely on the same. The pot A is, near its upper edge, provided with ears C C, in which the bail D is fastened. The ends of this bail, after passing through the ears C, are bent to form elbows F F, which are at an angle of about forty-five degrees with the bail, and their ends are bent inward to project over the lid B. The bail D, by these additions, acts for a double purpose. It acts as a pot-bail, and, at the same time, as a lid-holder; and when the handle is held at an angle of about forty-five degrees with the top edge of the pot, the ends of the elbows F press down on the lid and hold it while in the act of pouring the water from said pot.

While we prefer to have the elbows F made of the same piece as the bail itself, as that would be the cheapest and easiest way to manufacture the same, it is evident that they may be made separate, and attached to the bail, if so desired.

In connection with the combined bail and lid-holder, we also use a side handle, G, on the pot, made of wire and fastened in lugs I I, cast in the pot at the time of casting. This side handle is provided at its ends with similar elbows to those on the bail.

In Fig. 2 we have shown our invention applied to that class of pots or kettles in which the ears are fastened to the body of the pot or kettle, instead of being cast thereto, as shown in Fig. 1.

The object of our invention is to hold the lid of the pot while in the act of straining the water out of the pot, and, at the same time, prevent the steam of the pot from scalding the party while in the act of using it.

We do not claim, broadly, all methods of constructing a bail to hold the top or lid on a pot or kettle, as we are not the first to originate this idea; but only our peculiar construction of the bail, as herein set forth.

Having thus fully described our invention, what we claim as new, and desire to secure by Letters Patent, is—

1. The bail D, having elbows F F, projecting over the rim of the vessel to which it is attached, thus pressing against the top of the lid or cover, and preventing it from falling off while the vessel is being drained, substantially as herein described.

2. The combination of a loose lid or cover of a vessel with the bail D, provided with elbows or projections F F, to operate in the manner and for the purpose set forth.

In testimony that we claim the foregoing as our own we affix our signatures in presence of two witnesses.

THOMAS MORGAN.
JOSEPH F. NEIDHART.

Witnesses:
PETER DOLF,
JOHN A. FRENCH.